June 1, 1943.  T. R. JAMES ET AL  2,320,934
ACCUMULATOR
Filed April 11, 1941  8 Sheets-Sheet 5

Patented June 1, 1943

2,320,934

UNITED STATES PATENT OFFICE 2,320,934

ACCUMULATOR

Thomas R. James, Minneapolis, Minn., and Joseph Desjardins, Chicago, Ill., assignors to General Mills, Inc., a corporation of Delaware Application April 11, 1941, Serial No. 388,090

8 Claims. (Cl. 198—32)

This invention relates to means for receiving a series of cartons, packages, or the like from two feeding conveyors, as from two machines for filling and closing the cartons, the cartons often accumulating in considerable numbers on one or both of the feeding conveyors, said means then serving to feed these cartons at a regular and continuous rate to a delivery conveyor so long as the supply is received from both the feeding conveyors, or continuing to feed from one of the feeding conveyors while the other is not feeding them for any reason.

Another object is to provide means for taking two irregular streams of cartons or the like from different conveyors and combining these streams and delivering them as a regular stream to a third conveyor without interference of the streams.

Another object is to provide a mechanism for controlling the operation when the flow of packages is irregular and that can be reliably operated by light weight packages.

Another object is to provide a compact yet simple machine to accomplish the above purposes.

These and other objects as will hereinafter appear are accomplished by this invention which is fully described in the following specification and shown in the accompanying drawings in which.

The embodiment illustrated comprises a mechanism having a frame 20 with transverse channel beams 21 by means of which it is supported from the ceiling of a room by means of rods 22.

In general, there are two spaced continuous conveyors 25, 26 adapted to bring the lines of cartons A and B, respectively, from two other machines (not shown) which in this instance automatically fill, close, and glue-seal the cartons. This machine then combines the lines of cartons A, B into a steadily flowing stream C of spaced groups of three cartons each, which stream is then fed to a machine D which, in this instance, is a waxing machine.

Figures 1, 2, 3:
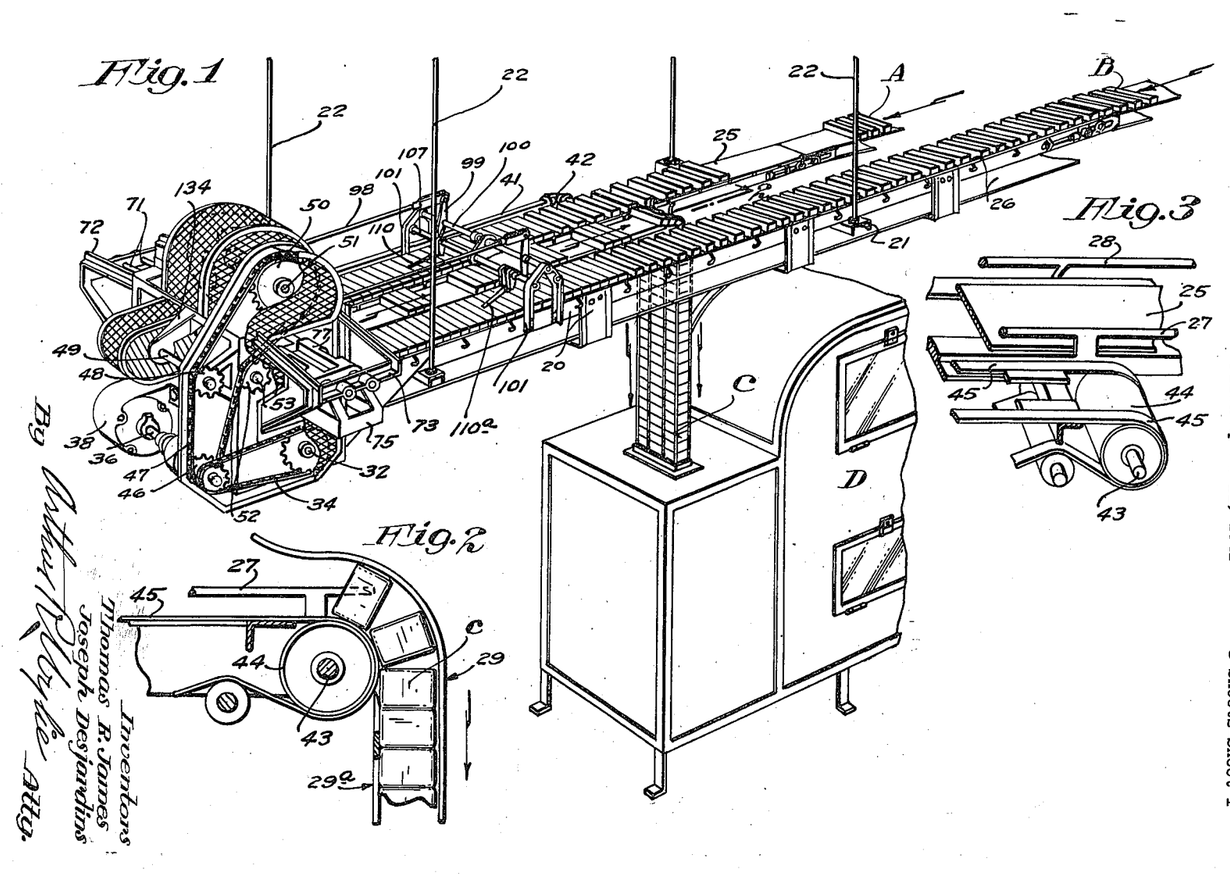
Figure 1 is a partial perspective view of the machine embodying the invention.
Fig. 2 is a partial enlarged vertical section on the line 2 of Fig. 1.
Fig. 3 is a partial perspective view as viewed from near the line 2 of Fig. 1 showing the relative positions of one of the outside conveyors and the tail end of the central return conveyor.

It will be understood that the lines of cartons A and B may be either regular or irregular as to spacing and it is the purpose of the mechanism shown in Fig. 1 to combine the irregular streams A and B and to deliver them as a steady stream C to the machine D. Inside guide rails 27 separate the central line C from the spaced outside lines A and B while guide rails 28 lie alongside the spaced conveyors. Guide rods 29, 29ª serve to guide the cartons in the line C.

Figures 4, 4A:
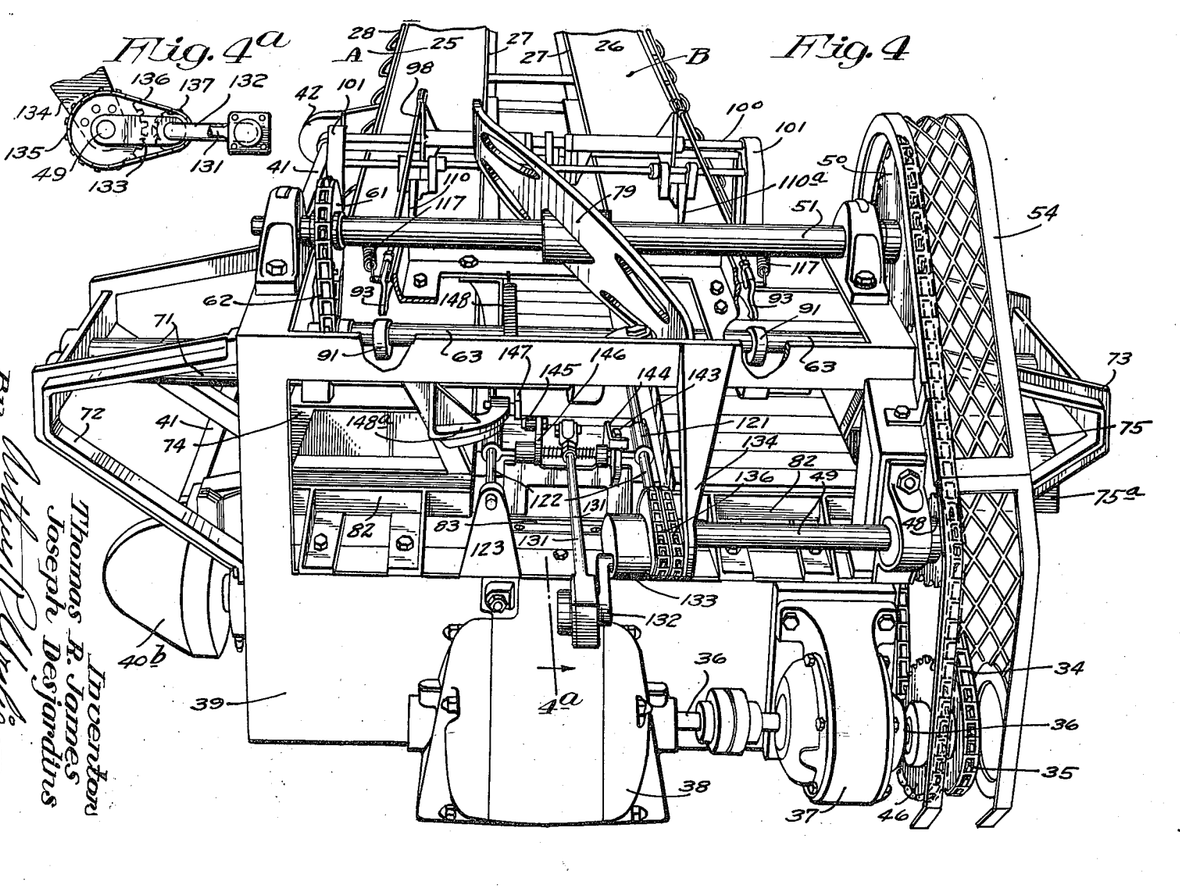
Fig. 4 is a partial enlarged perspective of the operating end of the machine.
Fig. 4a is a partial enlarged elevation on the line 4a of Fig. 4.
Figure 5:
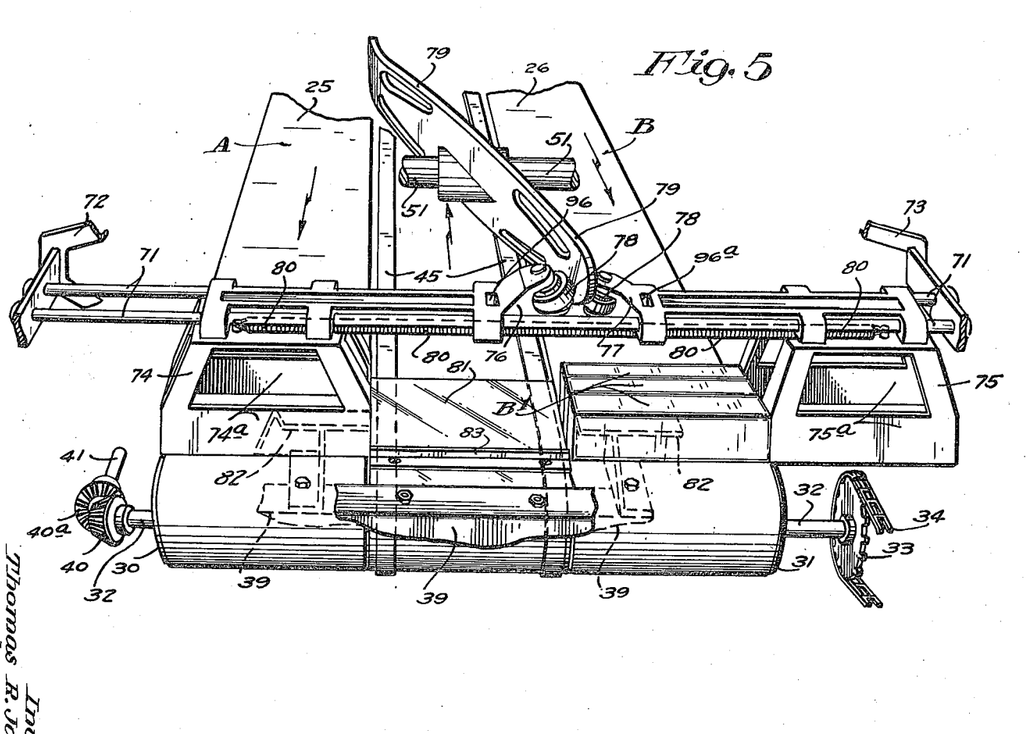
Fig. 5 is a perspective view similar to Fig. 4 with many of the parts removed showing the transverse shifting mechanism.

Referring now to Fig. 5, the outside conveyors 25, 26 are driven by suitable pulleys 30, 31 on a head shaft 32 which has a sprocket 33 driven by a chain 34 from a sprocket 35 (Fig. 4) on a shaft 36 of a speed reducer 37 which in turn is driven by an electric motor 38 which is suitably supported on a head frame 39 of the conveyor.

A bevel gear 40 on the shaft 32 (Fig. 5) meshes with a bevel gear 40ª on a shaft 41, these bevel gears being enclosed in a housing 40ᵇ (Fig. 4), which extends alongside the main frame and is suitably journaled in bearings carried thereby. This shaft extends forwardly and has suitable bevel gears (not shown) in a housing 42 which serve to drive a head shaft 43 having a head pulley 44 of the central or delivery continuous conveyor 45 (Fig. 3).

Figure 6:
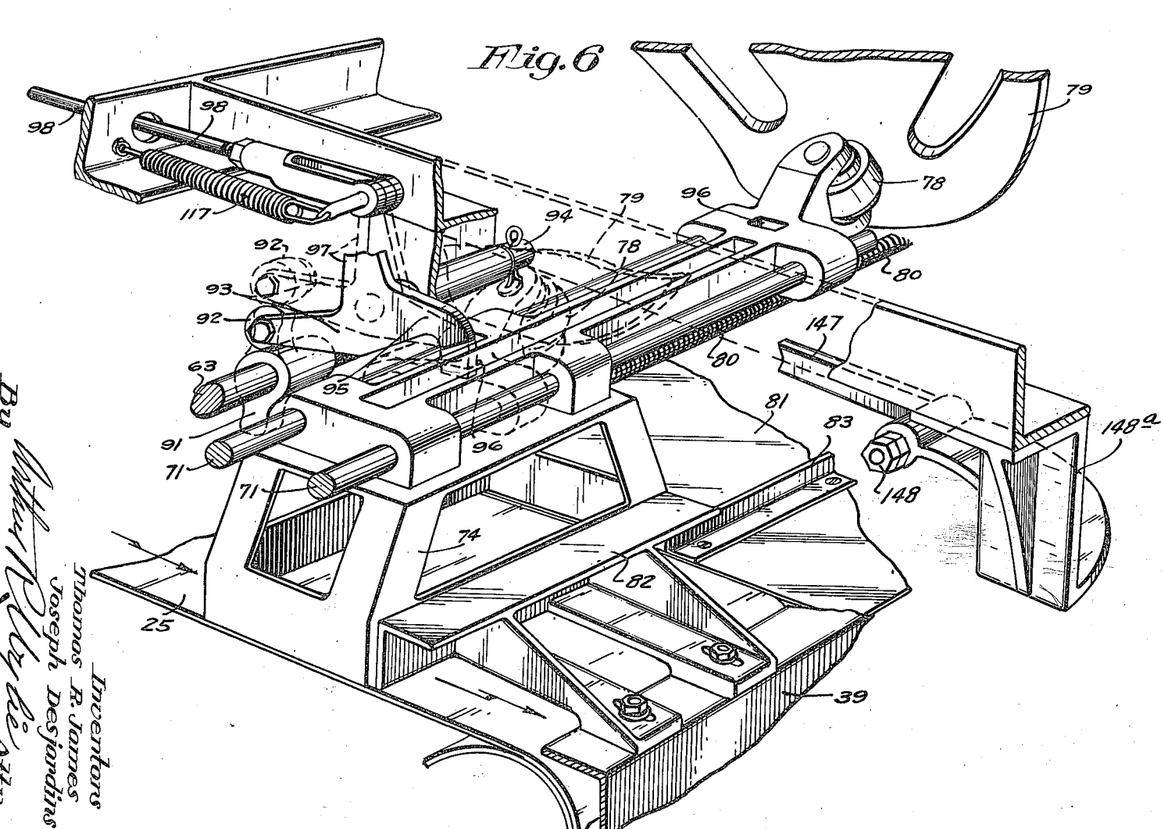
Fig. 6 is a partial enlarged perspective of portions of the transfer mechanism.

The shaft 36 (Fig. 1) also has keyed thereon a sprocket 46 which drives a chain 47 which drives a sprocket 48 on the crank shaft 49 and sprocket 50 on a cam shaft 51 and a sprocket 52 on a shaft 53, said shafts 49, 51 and 53 being suitably journaled in the head frame, as shown in Fig. 4. A guard 54 encloses this chain and its associated sprockets. The cam shaft 51 has keyed thereon a sprocket 61 which drives through a chain 62 a sprocket on a cam shaft 63 (Fig. 6) suitably journaled in the head frame. Referring to Figs. 4, 5 and 6, two spaced guide rods 71 are supported transversely to the conveyors at their ends in brackets 72, 73 to the sides of the head frame 39 and these serve as guides on which slide the transfer members 74, 75 which, as will later be seen, act alternately to push three cartons at a time first from one of the outside conveyors 25, 26 and then from the other to the central or delivery conveyor.

The inner ends 76, 77 of the transfer members 74 and 75 respectively (Fig. 5), carry rollers 78 which are held in contact with opposite faces of a cam 79 keyed on the cam shaft 51. This cam appears circular as viewed axially of the shaft 51. These rollers are yieldingly pressed against the opposite faces of the cam by means of long soft tension springs 80 which are secured at their ends to the members 74 and 75. These springs also serve, as will later be seen, to enable either of the members 74 or 75, or both of them, to be held at the outer ends of their strokes so as to render them inoperative to transfer cartons from the outer conveyors to the central conveyor.

Thus it will be seen that as the cam shaft 51 rotates, the cam 79 will propel the transfer members 74 and 75 back and forth across the side conveyors over which each member operates.

In Fig. 5, the member 74 has been moved by means of the cam 79 to its maximum position to the right thereby transferring three cartons to the right and into line with the center conveyor if such cartons were present. In Fig. 5, however, no such cartons are here shown. At the same time the transfer member 75 is at the extreme right-hand end of its movement and is in position to transfer in its next movement to the left the three cartons B¹, as shown. Ordinarily, there would be a line of cartons on both the conveyors 25 and 26, as shown in Fig. 1, but these are omitted in Fig. 5 for the sake of clearness. It will be noted that the sides 74ᵃ and 75ᵃ of the members 74 and 75 are made parallel to their travel, these members being slightly narrower than the width of three cartons so that as the member moves forward, pushing the three cartons with it on to a plate 81 (Fig. 5), one of these straight sides will serve to prevent the adjacent line of cartons from moving forward during the time these three cartons are being transferred to the plate 81 along a guide 83. Upon withdrawal of that member, however, out of the line of cartons, the line of cartons will be advanced until it encounters a stop 82, carried by the head frame.

Figure 12:
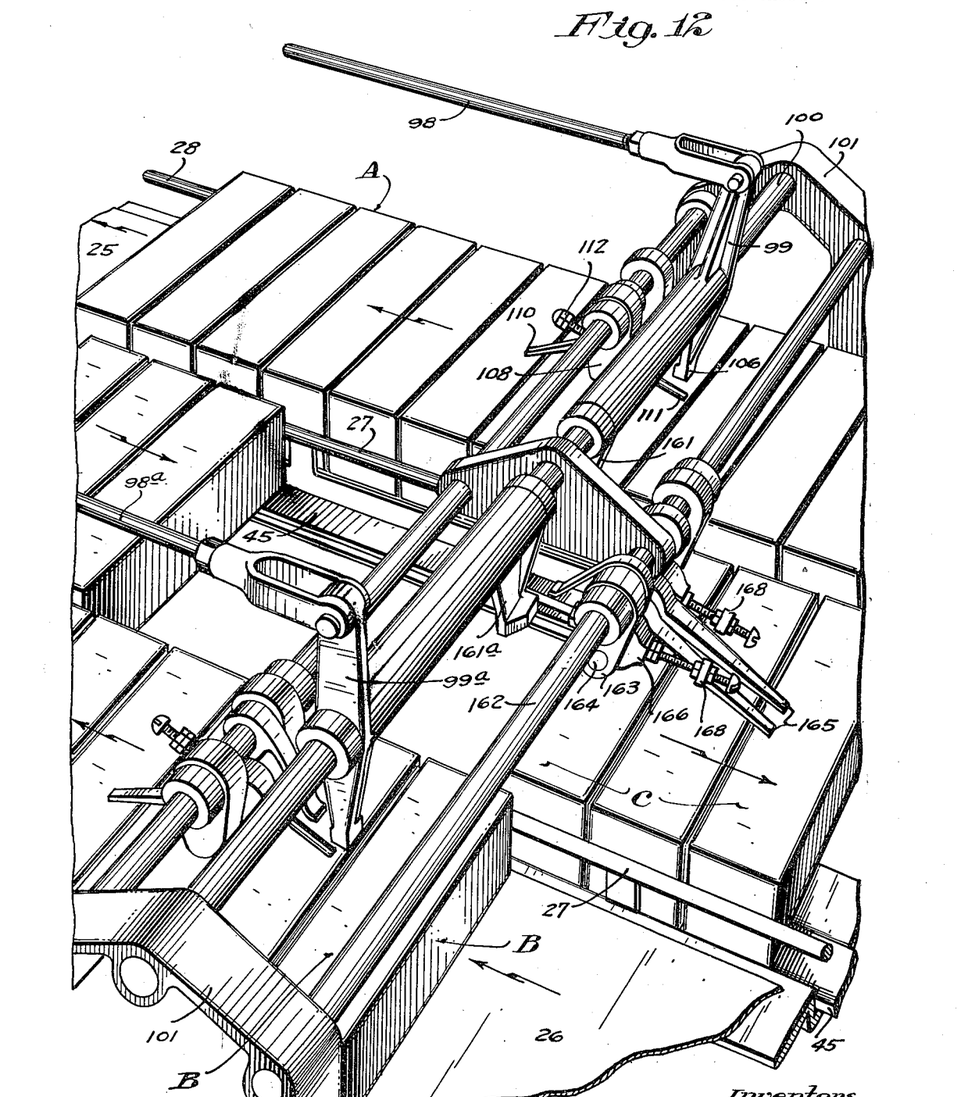
Fig. 12 is a partial perspective of mechanism for controlling the transfer mechanism.
Figures 13, 14, 15:
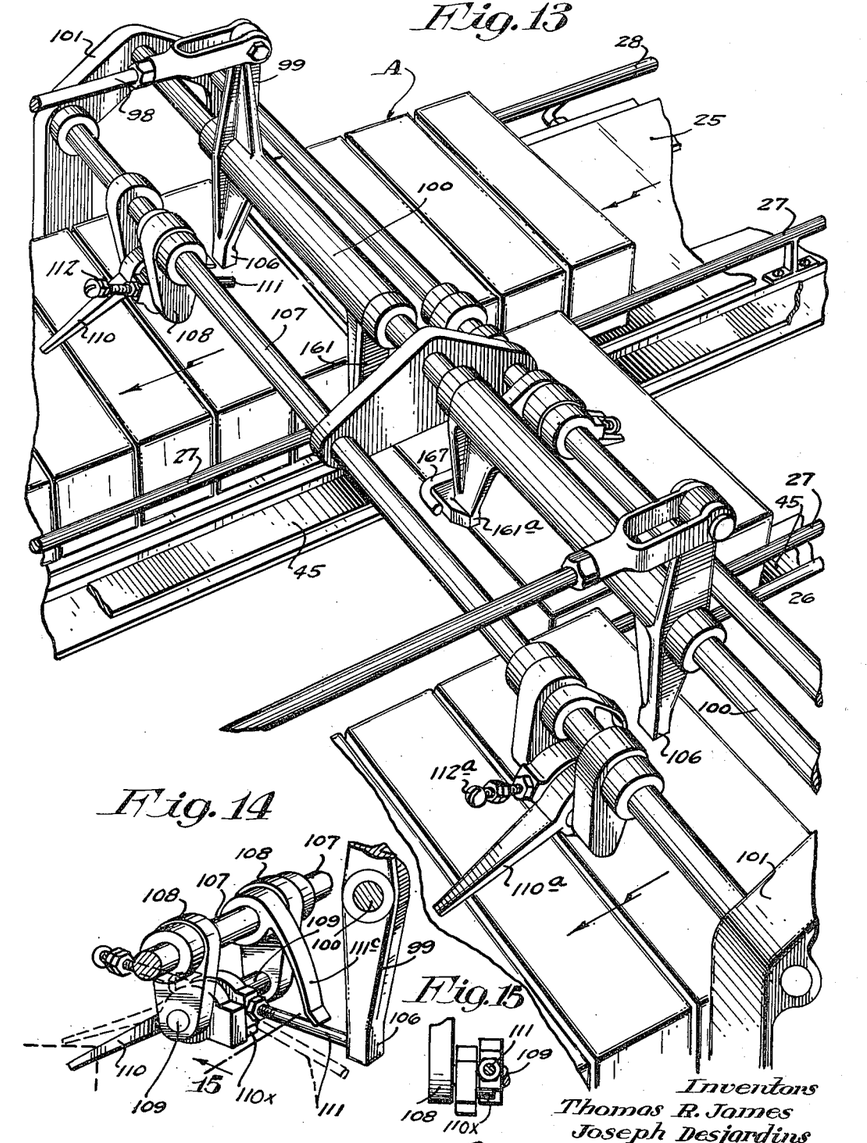
Fig. 13 is similar to Fig. 12 but viewed from a forward position.
Fig. 14 is a partial perspective of one of the control levers.
Fig. 15 is a partial transverse section on the line 15 of Fig. 14.

As will later be seen, there are times when it is desirable that either of the transfer members 74, 75 or both of them, shall be held in inoperative positions at the outer ends of their movement. The shaft 63 has a cam 91 keyed thereon. A cam follower roller 92 is pivotally mounted on one end of a bell crank 93 mounted on a stub shaft 94. One arm 95 of this bell crank is curved down in order to engage a hole 96 near the inner end of the transfer member 74. Another arm 97 is pivotally connected to a link 98 which, as shown in Fig. 12, is pivotally connected to a bell crank 99 which is pivotally mounted on a rod 100 carried at its ends by brackets 101 secured to the frame 20. The opposite end 106 of the bell crank 99 overlies the line of cartons A. Referring also to Figs. 14 and 15, a rod 107 is carried by the brackets 101 and carries a pair of supports 108 between which is pivotally mounted on a pin 109 a weighted finger 110 and a counter-balanced rod 111 having an upper stop 111ᶜ. The finger 110 carries a stop 111ˣ so that the two travel together when the weight of the member 111 holds it in contact with the stop.

When the rod 111 is raised to the full line position, as shown in Fig. 14 by the dropping of finger 110 when no carton supports it, the rod 111 engages the lower end of the lever 106, thereby holding the bell crank 93 in the dotted line position shown in Fig. 6 against the action of the spring 117 which tends to return this bell crank to a point where the follower 92 is in contact with the cam. This action can only take place when the high point of the cam 91 is at the dotted line position shown at the top and when the transfer member 74 has been shifted all the way to the left, as shown in Fig. 6, that is when the follower 78 is on the flat portion of the cam 79 and this cam is 180° from its full-line position here shown. When this happens, the transfer member 74 is held at its outermost position and it can only be released therefrom when the high point of the cam 91 again engages the follower 92.

The purpose of this method of locking the transfer member from transferring cartons from the line A on the conveyor 25 (or line B on conveyor 26) to the center conveyor, is to insure that a transfer of cartons will take place only so long as there is a supply of cartons on the conveyor. Thus, if the supply of cartons to the line A fails, the weighted finger 110 will drop because there is no carton at that point to support it, thereby lifting the counterbalanced rod 111 so that it serves as a stop for the lever 106, thereby inserting the curved end 95 of the bell crank into the opening 96 and thus locking the shifter member in inoperative position.

In order to make this locking mechanism more delicate in its operation, we have provided an adjustable counterweight 112 (Fig. 13) to the rod 111. By this means the weight of the rod 111 will not be sufficient to cause it to work loose from the lever 106 when a carton lifts the finger 110. In this event, the transfer member 74 might be caused to snap back at almost any point in the cycle of the cam 79, thereby causing considerable damage to any cartons which were in the way of this transfer member. Exactly similar apparatus is supplied on the right-hand side for controlling the movement of the transfer member 75. Some of this apparatus has been indicated by the same numerals as those for controlling the member 74 except that they are given corresponding numbers with a suffix a.

The mechanism for advancing the cartons in groups of three as they are received on the plate 81 from one or other of the shaft members will now be described. This consists, as shown in Figs. 4, 7, 8, 9 and 10, of a carriage 121 slidably mounted on forwardly extending parallel guide rods 122 which are secured at one end in brackets 123 and at the opposite ends in brackets 124. This carriage has pivotally secured thereto a link 131 which is pivotally mounted at its outer end on a crank 132 which, as shown in Fig. 4a, is pivotally mounted on a crank 133 which is keyed on the shaft 49, the latter being suitably journaled in a bracket 134 (Fig. 4). This bracket also has secured thereto a sprocket 135 having a sprocket chain 136 which also passes around a sprocket 137 on the shaft to which the crank 132 is connected. The sprocket 137 has one-half the number of teeth of the sprocket 135 so that the crank 132 makes a revolution about its axis for each revolution of the crank 133 but in the opposite direction. The cranks 132 and 133 are preferably of the same length.

Thus it will be seen that at any given point in the movement of the crank 133, the crank 132 has described twice the angle of the crank 133 with the result that the link 131 describes a straight line with a simple harmonic motion. That is of importance here for the reason that the space would not permit employing a simple crank of sufficient radius to give the necessary movement to the carriage 121.

Figures 9, 10, 11:
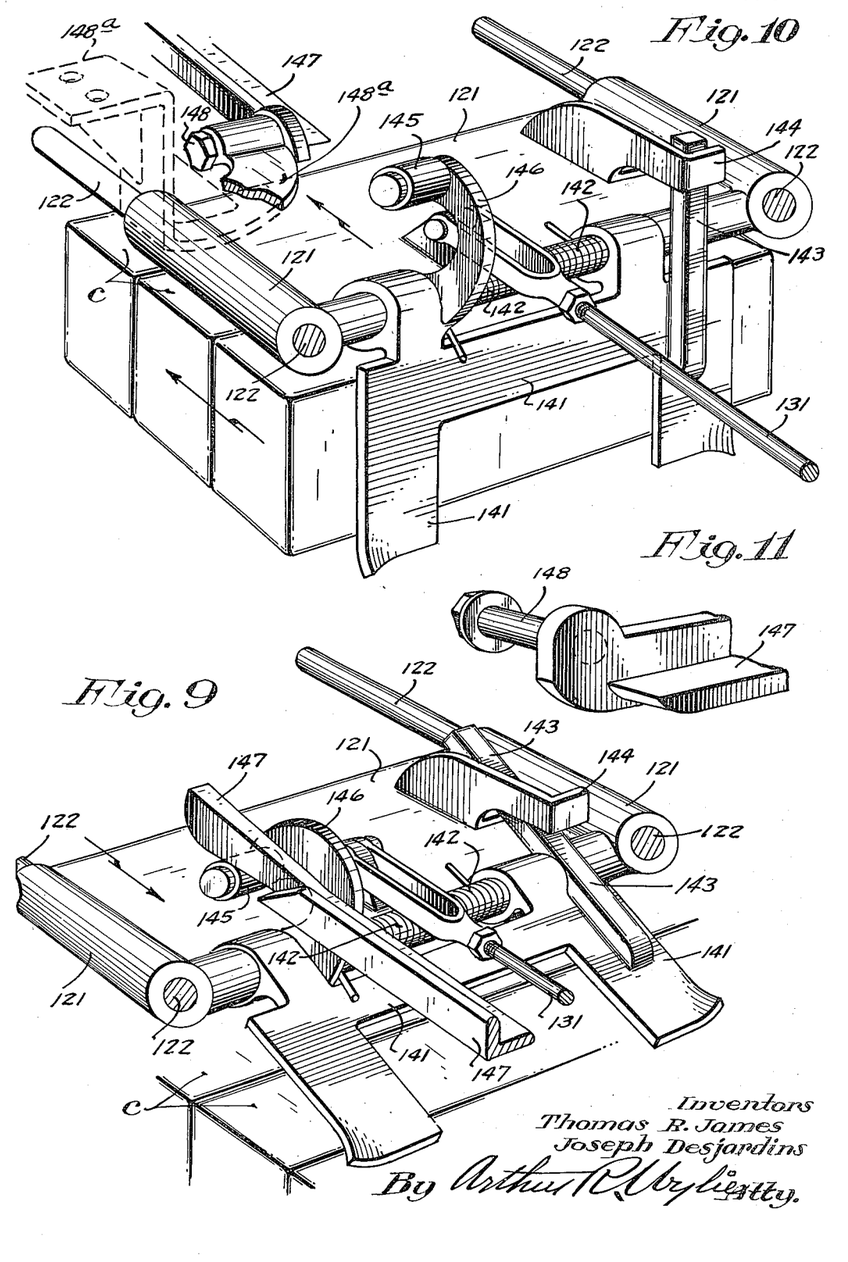
Fig. 9 is a partial perspective of a portion of the pusher mechanism corresponding to the position of the same in Fig. 8 showing this mechanism starting the return stroke.
Fig. 10 is a partial perspective view of the pusher mechanism near the rear end of its movement, but showing it just starting forward with a group of three cartons.
Fig. 11 is a partial perspective of the cam member for controlling the backward stroke of the pusher.

The carriage 121 is provided with a pusher 141 which is pivotally mounted on a transversely extending rod, not shown (Figs. 9 and 10) and is provided with a coil spring 142 which normally urges the pusher to the full vertical position shown in Fig. 10 wherein an arm 143 engages a stop 144.

Figure 7:
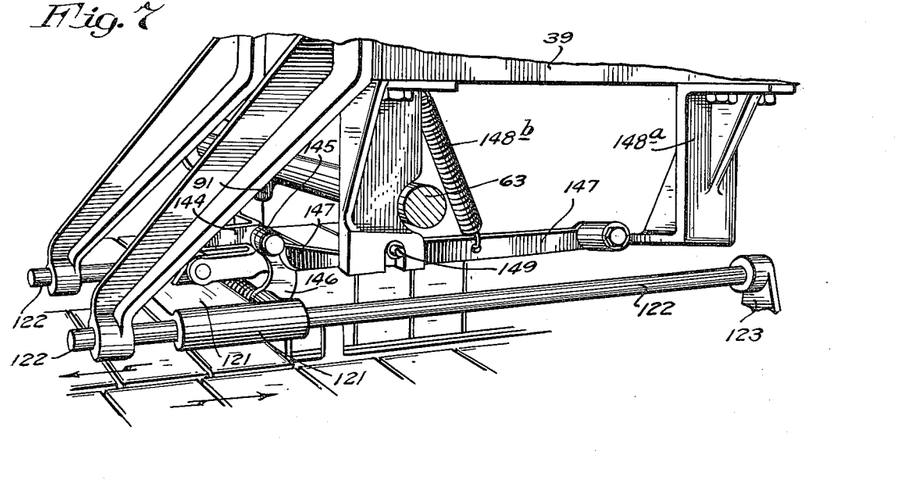
Fig. 7 is a partial perspective view of the pusher mechanism for feeding cartons or packages to the delivery conveyor, showing the pusher mechanism at the extreme forward end of its swing.
Figure 8:
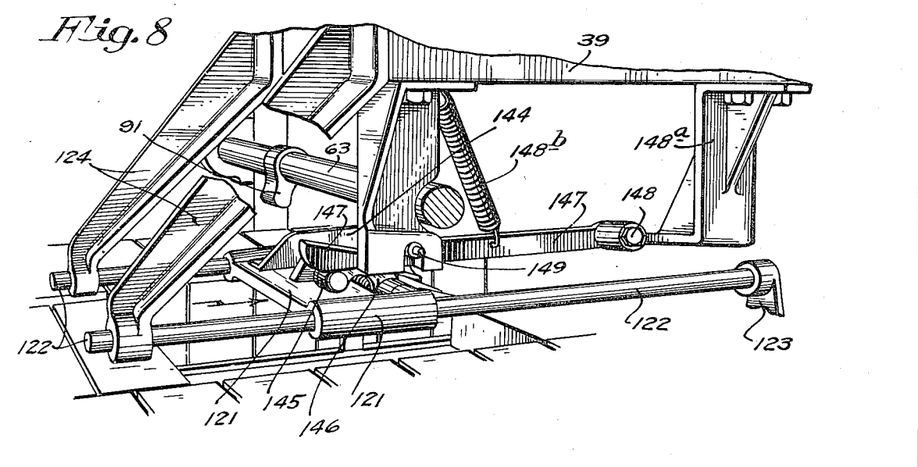
Fig. 8 is a similar view showing the pusher mechanism starting its return stroke.

The carriage is at the rearmost position in Fig. 10 and is about to travel forward. As it does so, the cam follower roller 145, rotatably mounted on a lever 146 secured to the pusher 141, passes up over a cam member 147 which is pivotally mounted at 148 on a bracket 148ª. The gate assumes the position shown in Fig. 10 throughout its forward movement at which time the roller 145 passes over the upwardly-inclined outer end of the cam bar 147, as shown in Fig. 7, this cam bar being lifted by means of a spring 148ᵇ. Then as the carriage returns, as shown in Figs. 8 and 9, the roller 145 passes under the outer end of the cam bar, thereby swinging the pusher 141 upwardly so that it passes above the cartons C¹. A stop pin 149 (Fig. 8) on the cam bar serves to limit the upward movement of the cam bar.

This accumulator mechanism delivers through a line C to a machine D. It is necessary, therefore, that the feed mechanism of the accumulator shall not feed the cartons faster than they can be taken care of by the machine D, otherwise many of the cartons in the delivery line may be wrecked. To solve this problem, we have provided a mechanism, shown principally in Figs. 12 and 13, to fufill these conditions. Its construction and operation are quite similar so that of the stop mechanism previously described which is operated by the weighted fingers 110. Thus the bell crank 99ª is provided with a lower lever 161ª and a rod 162 is carried by the brackets 101. Also brackets 163 are secured to the rod 162 and depend therefrom and have secured between them a rod 164 on which is pivotally mounted two weighted fingers 165, the construction and operation of which are alike so that the description of one will serve for the other. Beside each of these fingers is pivotally mounted a block 166 which carries a hook 167 (Fig. 13) which moves up and down following the movements of the weighted fingers 165 in the same way that the counterbalanced rod 111 follows the movements of the weighted finger 110. In this case, however, the hook 167, as shown in Fig. 13, passes around the lower end of the lever 161ª whereas the rod 111 being already on the far side of the lever 106 engaged it by a thrust. The effect is the same, however, in both instances, namely, it serves to hold the rod 98 back so as to cause the curved end 95 to engage the hole 96 in the transfer member, thereby holding that member out of engagement until the rod 98 is again released during one of the periods of dwell in the cam. Here too we have rendered the block 166 sensitive by providing it with an adjustable counterbalancing weight 168.

The operation of this mechanism for controlling the feed of cartons to the central conveyor is dependent upon the fact that these cartons are fed forward to the central conveyor in groups preferably of three, with spaces therebetween. The fingers 165 must, therefore, be placed at a proper distance from the transfer members 74, 75 so that normally there will be no cartons under these fingers at the instant the cam 79 is on either of its periods of dwell. Thus, when cartons pile up on the central conveyor faster than they can be taken by the machine D, they will back up until they lie under the fingers 165. As soon as that happens, the transfer members will be locked so that no more cartons can be fed to the central conveyor until such a time as the central conveyor is able to move the cartons from beneath the fingers 165. When this occurs, the curved end 95 of the bell crank corresponding to the transfer member then having its roller 78 in contact with the cam 79 will be withdrawn from its hole 96 and this transfer member will then operate to shift three more cartons from its conveyor to the plate 81. On the next half revolution of the cam 79, the other side will be released in this same way. That is why there are two fingers 165 each controlling the operation of one of the transfer members.

While we have shown and described but a single embodiment of our invention, it is to be understood that it is capable of many modifications. Changes, therefore, in the construction and arrangement may be made which do not depart from the spirit and scope of the invention as disclosed in the appended claims.

We claim as our invention:

1. In a machine of the class described, two spaced conveyors adapted to convey cartons of a given size and shape, a delivery conveyor between said spaced conveyors, a plate between the spaced conveyors, independently operable yieldable means for transferring cartons alternately from each of the spaced conveyors to the plate, means for advancing said cartons from the plate to the delivery conveyor, means operable by cartons on said spaced conveyos for rendering the transfer means for one of said spaced conveyors inoperative when there are no cartons on that conveyor at a given point and for again rendering said transfer means operative when cartons again arrive at said given point, and means operable by cartons on the delivery conveyor for rendering both the transfer means inoperative when cartons accumulate at a predetermined point on the delivery conveyor and for again rendering both the transfer means operative as soon as no cartons are at said predetermined point.

2. In a machine of the class described, two spaced conveyors adapted to convey cartons of a given sizes and shape, a delivery conveyor between said spaced conveyors, a plate between the spaced conveyors, independently operable yieldable means for transferring a group of cartons alternately from each of the spaced conveyors to the plate, a pusher for advancing said cartons from the plate to the delivery conveyor, means for lifting said pusher above the level of cartons on the delivery conveyor on the return stroke, means for rendering the transfer means for one of said spaced conveyors inoperative when there are no cartons on that conveyor at a given point and for again rendering said transfer means operative when cartons again arrive at said given point, and means operable by cartons on the delivery conveyor for rendering both the transfer means inoperative when cartons accumulate at a predetermined point on the delivery conveyor and for again rendering both the transfer means operative as soon as no cartons are at said predetermined point.

3. In a machine of the class described, two spaced conveyors adapted to convey cartons of a given size and shape, a delivery conveyor between said spaced conveyors, a plate between the spaced conveyors, independently operable yieldable means for transferring a group of cartons alternately from each of the spaced conveyors to the plate, a pusher for advancing said cartons from the plate to the delivery conveyor, cam-operated means for lifting said pusher above the level of cartons on the delivery conveyor on the return stroke, means for rendering the transfer means for one of said spaced coneyors inoperative when there are no cartons on that conveyor at a given point and for again rendering said transfer means operative when cartons again arrive at said given point, and means operable by cartons on the delivery conveyor for rendering both the transfer means inoperative when cartons accumulate at a predetermined point on the delivery conveyor and for again rendering both the transfer means operative as soon as no cartons are at said predetermined point.

4. In a machine of the class described, two spaced conveyors adapted to convey cartons of a given size and shape, a delivery conveyor between said spaced conveyors, a plate between the spaced conveyors, independently operable yieldable means for transferring a group of cartons alternately from each of the spaced conveyors to the plate, a pusher for advancing said cartons from the plate to the delivery conveyor, a cam bar, a cam follower carried by the pusher and operating above the cam bar on the forward stroke and beneath it on the return stroke for lifting said pusher above the level of cartons on the delivery conveyor on the return stroke, means for rendering the transfer means for one of said spaced conveyors inoperative when there are no cartons on that conveyor at a given point and for again rendering said transfer means operative when cartons again arrive at said given point, and means operable by cartons on the delivery conveyor for rendering both the transfer means inoperative when cartons accumulate at a predetermined point on the delivery conveyor and for again rendering both the transfer means operative as soon as no cartons are at said predetermined point.

5. In a machine of the class described, means for conveying packages in two separate streams to adjacent points, means for alternately transferring packages from each of the two points and reassembling them to combine the two streams into a third stream, means for conveying away the third stream, a member for locking one of the transferring means in inoperative position, a cam operably connected to the member for moving the same into and out of locking relation, cam means for operating the alternate transferring means, a rocker lever operably connected to the locking member, a finger adapted to be lifted by packages in one of said streams, and a rod operably connected to the finger so as to be lifted thereby when the finger falls because there are no packages to lift it, said rod being adapted when raised to engage the rocker lever to cause the locking member to engage the transfer means to prevent it from operating when there are no packages in one of the separate streams.

6. In a machine of the class described, means for conveying packages in two separate streams to adjacent points, means for alternately transferring packages from each of the two points and reassembling them to combine the two streams into a third stream, means for conveying away the third stream, a member for locking one of the transferring means in inoperative position, a cam operably connected to the member, a rocker lever operably connected to the locking member for moving the same into and out of locking relation, cam means for operating the alternate transferring means, a finger adapted to be lifted by packages in one of said streams, a rod operably connected to the finger so as to be lifted thereby when the finger falls because there are no packages to lift it, said rod being adapted when raised to engage the rocker lever to cause the locking member to engage the transfer means to prevent it from operating when there are no packages in one of the separate streams, a pusher for advancing each group of cartons onto the third conveying means, and means for lifting the pusher above the cartons on its return stroke.

7. In a machine of the class described, means for conveying packages in two separate streams to adjacent points, means for alternately transferring packages from one of the two points and then from the other and reassembling these packages to combine the two streams into a third stream, means for conveying away the third stream, a member for locking one of the transfer means in inoperative position, a cam operably connected to the locking member for moving the same into and out of locking relation, cam means for operating the alternate shifting means, a rocker lever operably connected to the locking member, a finger adapted to be lifted by packages in one of said streams, a rod operably connected to the finger so as to be lifted thereby when the finger falls because there are no packages to lift it, said rod being adapted when raised to engage the rocker lever to cause the locking member to engage the transfer means to prevent it from operating when there are no packages in one of the separate streams, and means operable by cartons on the delivery conveyor for rendering both the transfer means inoperative when cartons accumulate at a predetermined point on the delivery conveyor and for again rendering both the transfer means operative as soon as no cartons are at said predetermined point.

8. In a machine of the class described, means for conveying packages in two separate streams to adjacent points, means for alternately transferring packages from one of the two points and then from the other and reassembling these packages to combine the two streams into a third stream, means for conveying away the third stream, a member for locking one of the transfer means in inoperative position, a cam operably connected to the locking member for moving the same into and out of locking relation, cam means for operating the alternate shifting means, a rocker lever operably connected to the locking member, a finger adapted to be lifted by packages in one of said streams, a rod operably connected to the finger so as to be lifted thereby when the finger falls because there are no packages to lift it, said rod being adapted when raised to engage the rocker lever to cause the locking member to engage the transfer means to prevent it from operating when there are no packages in one of the separate streams, a pusher for advancing each group of cartons onto the third conveying means, mean for lifting the pusher above the cartons on its return stroke, and means operable by cartons on the delivery conveyor for rending both the transfer means inoperative when cartons accumulate at a predetermined point on the delivery conveyor and for again rendering both the transfer means operative as soon as no cartons are at said predetermined point.

THOMAS R. JAMES.
JOSEPH DESJARDINS.